Aug. 31, 1965     J. E. BENBENEK     3,203,715
GLASS-TO-METAL SEAL
Filed Dec. 31, 1959
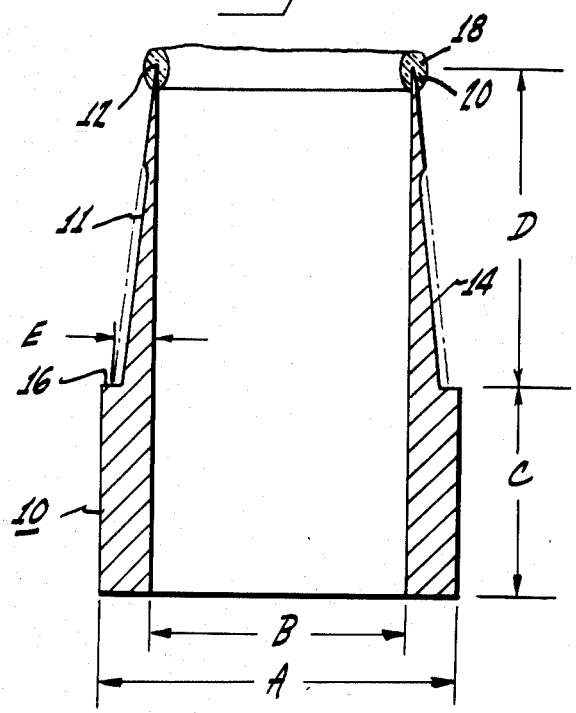
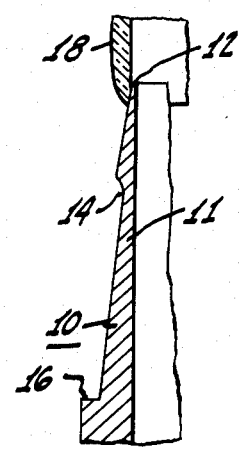
INVENTOR.
Jules E. Benbenek
BY
ATTORNEY

United States Patent Office 3,203,715
Patented Aug. 31, 1965

3,203,715
GLASS-TO-METAL SEAL
Jules Edward Benbenek, Lawrenceville, N.J., assignor to Radio Corporation of America, a corporation of Delaware
Filed Dec. 31, 1959, Ser. No. 863,343
5 Claims. (Cl. 285—238)

This invention relates to glass-to-metal seals. In particular, this invention relates to an improved vacuum tight glass-to-metal seal and a novel method of making the same.

In the past many known combinations of materials have been utilized in glass-to-metal seals. However, none of these known combinations has included a combination of a non-magnetic metal sealed to a hard glass which meets certain standards. Many copper-to-glass seals, including those involving a copper feather edge, have been known but these have several disadvantages. One of the principal disadvantages of copper-to-glass seals is that the copper feather edge is heavily oxidized during the formation of the seal and may eventually become porous and even collapse under external pressure. The strength of the feather edge also limits the size and geometry of seals that can be used. Furthermore, copper is a material whic his difficult to machine and treat for glassing to affect a good seal.

Another disadvantage of seals of this type is that their utility is limited. Thus, there is no convenient way known for joining copper to stainless steel. Stainless steel, which is a material that is relatively easy to machine, is used extensively as a non-magnetic material in many vacuum systems. Because copper cannot be conveniently joined to the stainless steel, copper-to-glass seals are not used extensively in these systems. Still further, in vacuum systems using mercury, such as mercury diffusion pumps, copper amalgamates with the mercury and cannot be used.

To avoid the above-mentioned problems, it would be desirable to join stainless steel directly to glass. However, due to the fact that the coefficients of expansion of hard glass ($4.6 \times 10^{-6}$ per ° C.) and stainless steel ($17 \times 10^{-6}$ ° C.) differ considerably, it has not been possible to consistently reproduce such a seal in the past.

It is therefore an object of this invention to provide a new and improved seal between a non-magnetic metal member and glass.

It is a further object of this invention to provide a novel method of and means for producing an improved seal between stainless steel and hard glass.

These and other objects are accomplished in accordance with this invention by providing a tapered edge on one end of a stainless steel tubing with a particular under-cut adjacent to but spaced from the terminus of the tapered end. Due to the undercut, the stainless steel processing, and particular manufacturing steps, the stainless steel may be sealed to a borosilicate (hard) glaass tubing to form a strong, rigid, vacuum tight seal even though the expansion characteristics of the materials are radically different.

The invention will be more clearly understood by reference to the accompanying drawing wherein:

FIG. 1 is a sectional view of an improved seal in accordance with this invention; and FIG. 2 is a fragmentary sectional view of glass and metal work pieces in an intermediate stage of seal formation.

In FIGS. 1 and 2 a stainless steel tubing 10 is shown which has a tapered portion 11 terminating in a fine edge 12. The non-magnetic stainless steel tubing 10 is of the type commercially available from the Fansteel Metallurgical Co. and is known as American Iron and Steel Institute type No. 304 stainless steel. The composition of this particular stainless steel is believed to be by weight, 18 to 20% chromium, 5 to 10% nickel and the balance iron. Before machining, the stainless steel tubing is relieved of stresses by firing in dry hydrogen at a temperature of approximately 1,065° C. for a period of time of approximately fifteen minutes. The stainless steel tube 10 is machined, as shown in the FIGS. 1 and 2, to the required dimensions. As shown, the tubing 10 is machined to taper from a shoulder 16 to the fine edge 12. The thickness of the member 10 at the beginning of the taper (dimension E) is approximately 0.012 inch. At the fine end of the taper, the tube is between .0015 inch and 0.0030 inch in thickness. If the edge 12 is less than 0.0015 inch in thickness, the edge is likely to be rough and therefore will not form a good seal. If the edge at the end of the taper is thicker than approximately 0.0030 inch, the tapered edge will not have sufficient flexibility to form a good seal.

An important feature of the tapered portion 11 is the presence of an under-cut 14, the tapered portion prior to the formation of the under-cut being shown as a dotted line for simplicity of illustration, and which is machined parallel to the taper and to a depth of approximately 0.002 inch. The under-cut 14 extends from the shoulder 16 to a location near the tapered end. The under-cut 14 may extend for a distance within the range of approximately ½ inch to 1 inch. The length from the shoulder 16 to the end of the taper (dimension D) is not critical. It should be noted that the under-cut 14 does not extend completely to the end of the taper but terminates substantially within the range of ⅛ inch to ¼ inch, and preferably at approximately 5⁄32 of an inch, from the free end of the taper. Therefore, this seal is distinguishable from the known seals wherein a feather edge is provided that is tapered to as fine an edge as possible. Neither the thickness of the tubular member 10 beyond the shoulder 16 (dimension A minus B) nor the length beyond shoulder 16 (dimension C) is critical for seals made in accordance with this invention. However, it should be noted that the thickness at the end of the under-cut 14 adjacent the edge 12, is approximately 0.002 inch, while the thickest portion between the end of the under-cut 14 and the tapered end 12, i.e. just adjacent to the end of the under-cut, is approximately 0.005 inch. Thus, there is a portion between the under-cut region 14 and the free end 12 of the taper that is thicker than the thinnest portion of the undercut region.

After machining the stainless steel tubing 10, the tubing 10 is degreased and then oxidized by firing in line hydrogen (i.e. hydrogen containing some moisture) at a temperature of approximately 1,065° C. for a period of approximately 20 minutes. If the tubing 10 is to be welded at an area that is within two inches of the subsequent glass seal 20, a snug fitting tapered copper plug (not shown) is inserted within the tapered end of the tubing 10 to maintain the periphery of the stainless steel tubing, and the welding process is carried out before the glass-to-metal seal is formed. Once the welding has been done, the assembly should then be degreased again and vacuum fired with the tapered copper plug (not shown) within the tapered end and at a temperature of approximately 1,000° C. for a period of time of approximately 15 minutes. The stainless steel tubing is then ready for the sealing operations.

Before the stainless steel-to-glass seal is made, the stainless steel tubing 10 is wrapped, to within one half inch of the tapered edge, with wet asbestos paper (not shown) to affect cooling.

The glass member 18 is made of a glass such as borosilicate glass. One reason for selecting this particular hard glass is that the expansion coefficient of the material is larger than those of other known hard glasses, and therefore more closely approaches the expansion coefficient of the stainless steel. Another reason for the selection of this particular glass is that the borosilicate glass readily wets oxidized stainless steel. Further advantages of the borosilicate glass are that it readily seals to other hard glasses and other metals and has an optical quality which is high. Still further, this particular glass is commercially available in many sizes and shapes and thus the seal is not limited as to size or geometry. Borosilicate glass No. 7052 (FN) is an example of glass that may be used and is commercially available from the Corning Glass Co. and has a coefficient of thermal expansion of $4.6 \times 10^{-6}$ per ° C.

For the sealing process, the stainless steel tubing 10, having been prepared as described above, is chucked in a lathe. A piece of the glass is shaped to fit the exterior of the fine edge 12 of the stainless steel tubing 10 with the tubing 10 extending into the glass tube to a depth of approximately 0.080 inch, as shown in FIG. 2. Upon heating the glass, and applying radial pressure between the glass and stainless steel tube, the stainless steel is fused onto the inner periphery of the glass tubing. During this step of the process, the glass tubing is heated to a temperature of approximately 1150° C. which is sufficient to soften the glass. While performing this operation, the majority of the flame applied to the structure should be directed onto the glass member 18 to prevent over-heating of the metal edge. Once the glass is fused to the outside of the metal, the glass member 18 is flame cut at a distance of approximately ⅛ inch from the feather edge. The glass remaining is then carefully rolled over onto the inside of the stainless steel tubing, by means such as a graphite rod, to complete the internal beading onto the inner periphery of the tapered end 12 of the stainless steel tubing 10, as shown in FIG. 1. It should be noted that the glass tubing does not extend onto the under-cut area of the tapered portion 11. Additional lengths of glass may then be added to the sealed glass bead, by conventional glass-to-glass sealing methods. After these steps, the assembly is flame annealed by a lathe burner (not shown) at a temperature of approximately 510° C. for a period of time of approximately 10 minutes.

Many successful stainless steel to hard glass seals have been made by the above-described process. Although the reasons why this process is successful in reproducing high quality vacuum tight seals of this type are not fully understood, one reason for success is believed to be due to the presence of approximately 18% chromium in the stainless steel tubing 10. With this percentage of chromium, a portion of the chromium is drawn out of the metal during the metal treating process and is oxidized to continually wet the glass to complete the metal-to-glass seal. Thus, other compositions of stainless steel can be used to form the seal in accordance with this invention so long as the stainless steel includes the proper amount of chromium. Stainless steels having less than 12% chromium will under-oxidize and will not provide sufficient wetting oxide to form the seal so that additional wetting agents would have to be plated on the tubing to form the proper seal. Stainless steels having more than 25% chromium will tend to over oxidize resulting in a weak or leaky seal.

A further reason for the success of this particular seal is the presence of the under-cut 14 which permits the tapered end 12 to bend outwardly during the sealing process. In fact, greatly enlarged photographs of seals that have been made in accordance with this invention have indicated that, after the seal has been made, the extreme free end portion of the tapered end of the stainless steel tubing is inclined with respect to the axis of the tubing approximately 5 degrees.

It should be understood that this invention is not limited as to the size of tubings used. As an example, borosilicate glass-to-stainless steel tubings as large as six inches in diameter have been successfully formed using this invention. Also, seals made in accordance with this invention can be baked and reworked without harm to the seals.

What is claimed is:

1. A vacuum-tight non-magnetic metal-to-glass seal comprising a stainless steel member including chromium in an amount only from 12% to 25% by weight, said stainless steel member having a first tapered region extending to an end of said member and a second tapered region extending to said first tapered region, said first tapered region having a greater thickness than said second tapered region in the zone of juncture of said regions, and a hard borosilicate glass member sealed to and in direct contact with said first tapered region.

2. A vacuum-tight metal-to-glass seal comprising a non-magnetic stainless steel member including chromium in an amount only from 12% to 25% by weight, said member having an end and first and second tapered portions, said first tapered portion extending to and having its thinnest part at said end, said second tapered portion having its thinnest part adjacent to the thickest part of said first tapered portion, said thinnest part of said second tapered portion being thinner than said thickest part of said first tapered portion, and a hard borosilicate glass member sealed to and in direct contact with said first tapered portion.

3. A vacuum-tight metal-to-glass seal comprising a metal member having a first tapered region extending to a free end of said member, and a second tapered region extending to said first tapered region, said first tapered region having a greater thickness than said second tapered region in the zone of juncture of said regions, said metal member consisting of stainless steel including a chromium content substantially only within the range of from 12% to 25% by weight, and a glass member sealed to and in direct contact with said first tapered region, said glass member being made of borosilicate glass.

4. A non-magnetic metal-to-glass seal comprising a hollow tubular metal member consisting of non-magnetic stainless steel having a chromium content within the approximate range of only from 12% to 25% by weight, said stainless steel having a nickel content within the approximate range of 5% to 15% by weight, said metal member having a first tapered region extending to an end of said member and a second tapered region extending to said first tapered region, the thinnest portion of said first tapered region having a thickness within the approxi- range of 0.0015 to 0.0030 inch, said second tapered region having its thinnest portion adjacent to the thickest portion of said first tapered region, said thinnest portion of said second tapered region constituting an undercut spaced from said end by a distance within the approximate range of 0.125 to 0.250 inch, the depth of material removed from said thinnest portion of said second tapered region being approximately 0.002 inch, said undercut being thinner than said thickest portion of said first tapered region, and a hollow tubular glass member sealed to and in direct contact with said first tapered region, said glass member being made of a hard borosilicate glass.

5. A glass-to-metal seal comprising a stainless steel member having the composition in percent by weight of 12 to 25% chromium, 5 to 10% nickel and the balance iron, said steel member having a thick portion and a tapered portion, said tapered portion being of reduced thickness extensive from said thick portion and near the terminal edge having a point of greater thickness, said point of greater thickness being adjacent to the terminus of said tapered portion, and gradually decreasing to a feathered edge from said point, and a hard borosilicate member sealed to and in direct contact with said stainless steel feathered edge member.

References Cited by the Examiner

UNITED STATES PATENTS

| | | | |
|---|---|---|---|
| 2,071,196 | 2/37 | Burger et al. | 161—196 |
| 2,125,315 | 8/38 | Ronci | 49—81 |
| 2,336,488 | 12/43 | Litton | 49—92.5 XR |
| 2,371,627 | 3/45 | Kingston | 29—195 |
| 2,457,144 | 12/48 | Gooddale | 49—81 |
| 2,564,950 | 8/51 | Black. | |
| 2,584,354 | 2/52 | Kissinger et al. | 161—196 |
| 2,859,562 | 11/58 | Dorgelo et al. | 29—195 |
| 3,004,182 | 10/61 | Pfaender | 161—196 |

OTHER REFERENCES

Rose Stainless Steel for Television, reprint from Metal Progress, publ. #St. 563, June 1950, pp. 761–764.

ALEXANDER WYMAN, *Primary Examiner.*

EARL M. BERGERT, ARTHUR P. KENT, *Examiners.*